(12) United States Patent
Mine

(10) Patent No.: US 6,335,689 B1
(45) Date of Patent: Jan. 1, 2002

(54) DRIVER'S AROUSAL LEVEL ESTIMATING APPARATUS FOR VEHICLE AND METHOD OF ESTIMATING AROUSAL LEVEL

(75) Inventor: Atsushi Mine, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/416,793

(22) Filed: Oct. 13, 1999

(30) Foreign Application Priority Data

Oct. 16, 1998 (JP) .......................................... 10-295691

(51) Int. Cl.$^7$ .............................................. G08B 23/00
(52) U.S. Cl. ........................ 340/576; 180/272; 340/575
(58) Field of Search ................................ 340/575, 576; 180/272

(56) References Cited

U.S. PATENT DOCUMENTS

| | | | | |
|---|---|---|---|---|
| 5,570,087 A | * | 10/1996 | Lemelson | 340/576 X |
| 5,745,031 A | * | 4/1998 | Yamamoto | 340/576 X |
| 5,815,070 A | * | 9/1998 | Yoshikawa | 340/576 X |
| 5,821,860 A | * | 10/1998 | Yokoyama et al. | 340/576 |
| 5,883,587 A | * | 3/1999 | Ikemoto | 340/988 |
| 5,900,819 A | * | 5/1999 | Kyrtsos | 340/576 |
| 6,061,610 A | * | 5/2000 | Boer | 340/576 X |

FOREIGN PATENT DOCUMENTS

| | | |
|---|---|---|
| JP | 58192 | 3/1993 |
| JP | 99756 | 4/1997 |

OTHER PUBLICATIONS

English–language Abstract of Japanese Publication 5–58192, 1 page. (WEST database), Mar. 1993.*

* cited by examiner

Primary Examiner—Thomas Mullen
(74) Attorney, Agent, or Firm—Martin A. Farber

(57) ABSTRACT

A lateral displacement of a vehicle is detected consecutively and the displacement is subjected to a frequency conversion to obtain a frequency component power. Then, a first integral of the frequency component power is obtained with respect to frequency of a low frequency domain and a second integral of the power is obtained with respect to frequency of a high frequency domain. An evaluation value is calculated from thus obtained first and second integrals and a driver's arousal level is judged based on the evaluation value.

19 Claims, 9 Drawing Sheets

DRIVER'S AROUSAL LEVEL ESTIMATING APPARATUS FOR VEHICLE AND METHOD OF ESTIMATING AROUSAL LEVEL

BACKGROUND OF THE INVENTION

1. Field of the Invention

The present invention relates to an apparatus and method for estimating an arousal level of a vehicle driver by detecting vehicle behavior such as a lateral displacement of a vehicle.

2. Background Art

A technology for preventing car accidents caused by decline in driver's arousal level is one of most important developmental subjects of today from the view point of vehicle safety. In recent years, studies for detecting drowsiness or arousal level of vehicle drivers, developments of techniques for warning them against falling into a drowsy state are actively undertaken. When a driver's arousal level declines, especially when a vehicle travels at high speeds, serious accidents may happen. Even if he or she does not reach such drowsy state, drowsiness induces him or her to an absent-minded state which inhibits a quick averting operation, this leading to accidents.

Japanese Patent Application Laid-open No. Toku-Kai-Hei 5-58192 discloses a technique in which so-called "dozing at the wheel" is detected based on low frequency components in operation quantity. In this disclosure, operation quantities such as steering angle, lateral displacement of a vehicle and the like are monitored consecutively and low frequency components in frequency spectrum of the operation quantity are extracted. On the other hand, low frequency components in frequency spectrum of operation quantity at normal operations are memorized as sample data beforehand. Then, the low frequency components after a specified time elapses from the start of the vehicle are compared with those sample data. If a difference between the low frequency components and the sample data exceeds a predetermined value, it is judged that the driver dozes at the wheel.

However, the sample data which are used for the judgment reference are ones collected under a certain transport environment (weather, road surface conditions, time, degree of traffic jams, vehicle speed and others). If the running condition changes, the judgment whether or not the driver is in a dozing state is accompanied by errors. That is, this background art has a problem that, when the running condition changes in a large scale, it is difficult to obtain a correct judgment as to whether or not the driver is in a dozing state.

SUMMARY OF THE INVENTION

It is an object of the present invention to provide an arousal level estimating apparatus capable of accurately judging the arousal level of a vehicle driver without being affected by running circumstances and vehicle speed.

To achieve the object, a driver's arousal level estimating apparatus comprises an operation quantity detecting means for continuously detecting an operation quantity of the vehicle, a power calculating means for calculating a frequency component power by applying a frequency conversion to the operation quantity, a low frequency domain establishing means for establishing a low frequency domain lower than a predetermined reference frequency, a high frequency domain establishing means for establishing a high frequency domain higher than the reference frequency, an evaluation value calculating means for obtaining a first integral of the frequency component power in the low frequency domain, for obtaining a second integral of the frequency component power in the high frequency domain, and for calculating an evaluation value based on the first integral and second integral, and a judging means for judging an arousal level of the driver based on the evaluation value.

DESCRIPTION OF PREFERRED EMBODIMENTS

Figure 1:
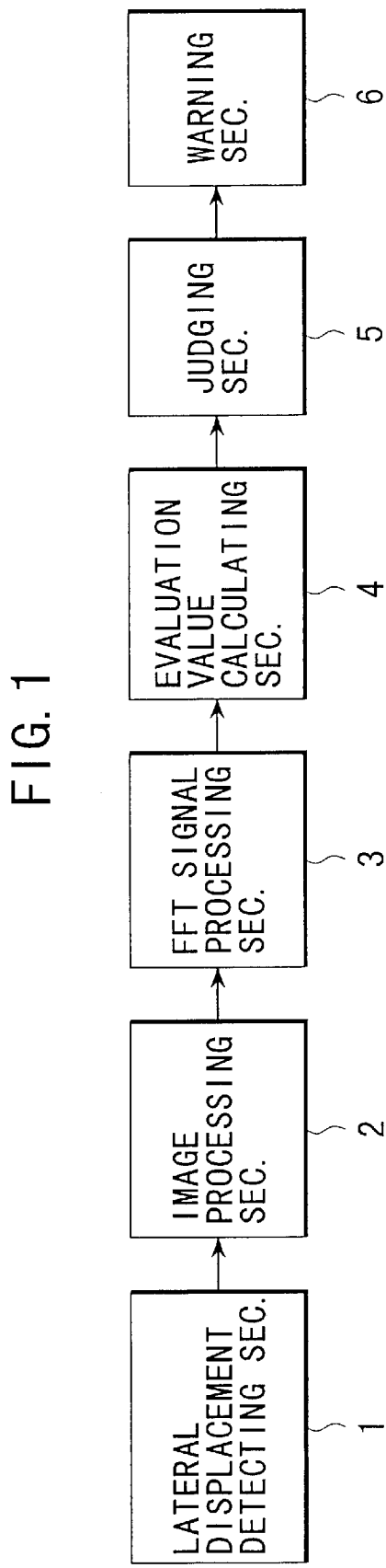
FIG. 1 is a simplified block diagram of an arousal level estimating apparatus according to the present invention.

Referring now to FIG. 1, numeral 1 denotes a lateral displacement detecting section 1 for detecting a lateral displacement, as an operation quantity, of a vehicle, which comprises for example a stereoscopic camera or a monocular camera, using CCD and the like. Numeral 2 denotes an image processing section in which images obtained in the lateral displacement detecting section 1 are processed to calculate displacement quantities. For example, in case of a right hand drive vehicle, a CCD camera images a left lane marker of a road and one frame of thus imaged data is memorized in the image processing section 2. Then, the left lane marker is recognized utilizing image recognition technique. That is, an area including the left lane marker is identified. The vehicle position within the lane can be calculated from the lateral distance from the center of vehicle to the left lane marker and the road width. Instead of cameras, the lateral displacement detecting section 1 can use a road-vehicle communication system based on magnetic nails buried beneath roads, or use a navigation system based on GPS to detect lateral displacements. For reference, Japanese Patent Application No. Toku-Kai-Hei 9-99756 discloses a system for issuing an alarm when a vehicle sways while driving. Further, since it is possible to detect lateral displacement, from steering angles, the lateral displacement detecting section 1 can use a steering angle sensor. Furthermore, the lateral displacement may be estimated by detecting yaw rate or lateral acceleration. The lateral sway or fluctuation of the vehicle is measured for example with resolution of 1 centimeter and at time interval of 0.1 seconds. Data of displacement quantity is stored in a shift register of a FFT signal processing section 3 for obtaining frequency components power. The shift register stores a series of displacement quantity data calculated according to elapsed time and collected for a specified period. The data stored in the shift register is successively updated by newly calculated displacement quantity data.

The FFT signal processing section 3 is realized by a micro-computer unit. Similarly, an evaluation value calculating section 4 and judging section 5 are also realized by the micro-computer unit. The micro-computer realizes respective functional blocks shown by reference numerals 3, 4 and 5 according to a flowchart in FIG. 2. The micro-computer is constituted by CPU, RAM, ROM, input and output circuits and the like. The ROM stores programs to carry out steps, a reference frequency $f_{th}$, an evaluation threshold value $H_{th}$ and the like, which will be described hereinafter.

(First Embodiment)

Figure 2:
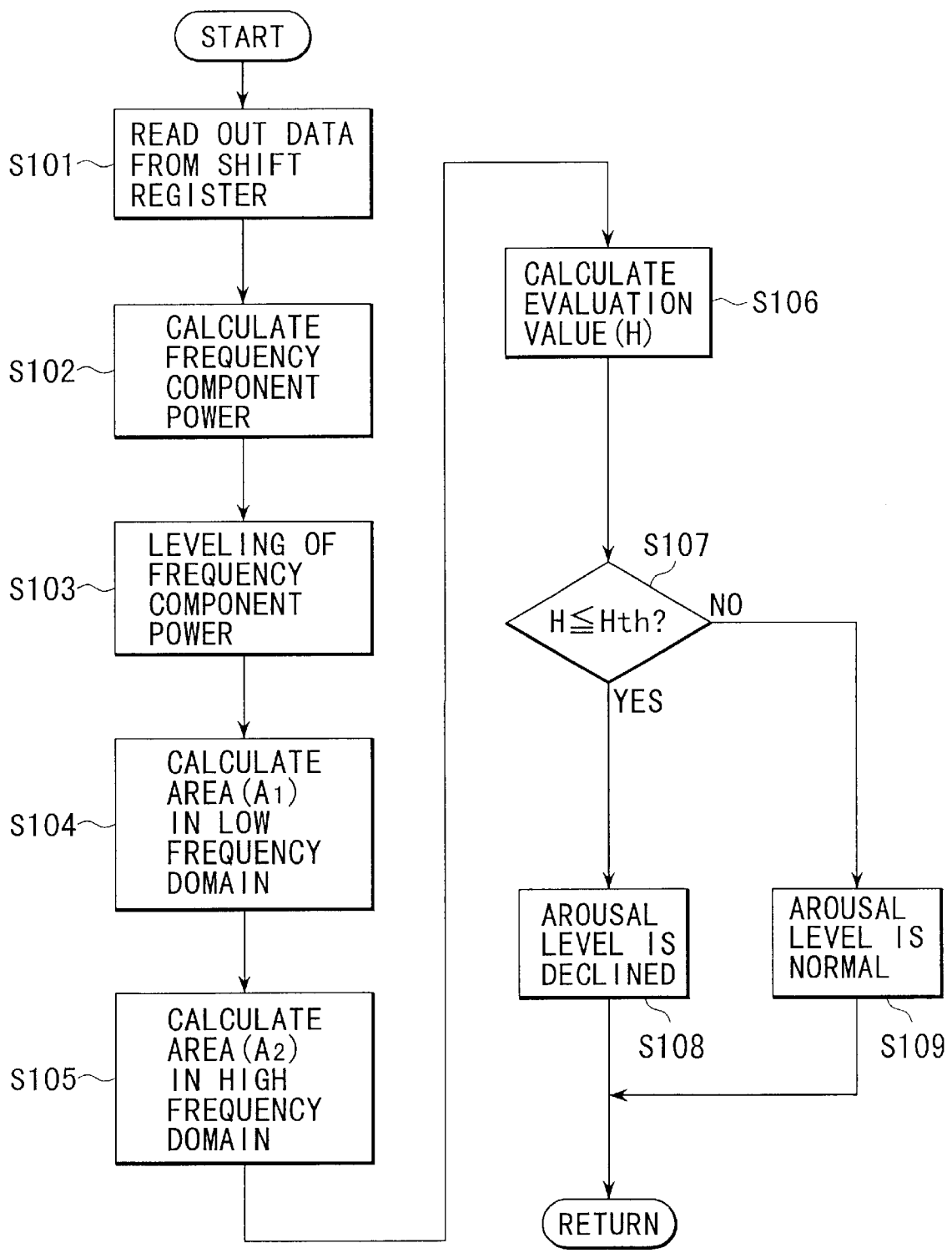
FIG. 2 is a flowchart showing steps for estimating an arousal level according to a first embodiment of the present invention.
Figure 3:
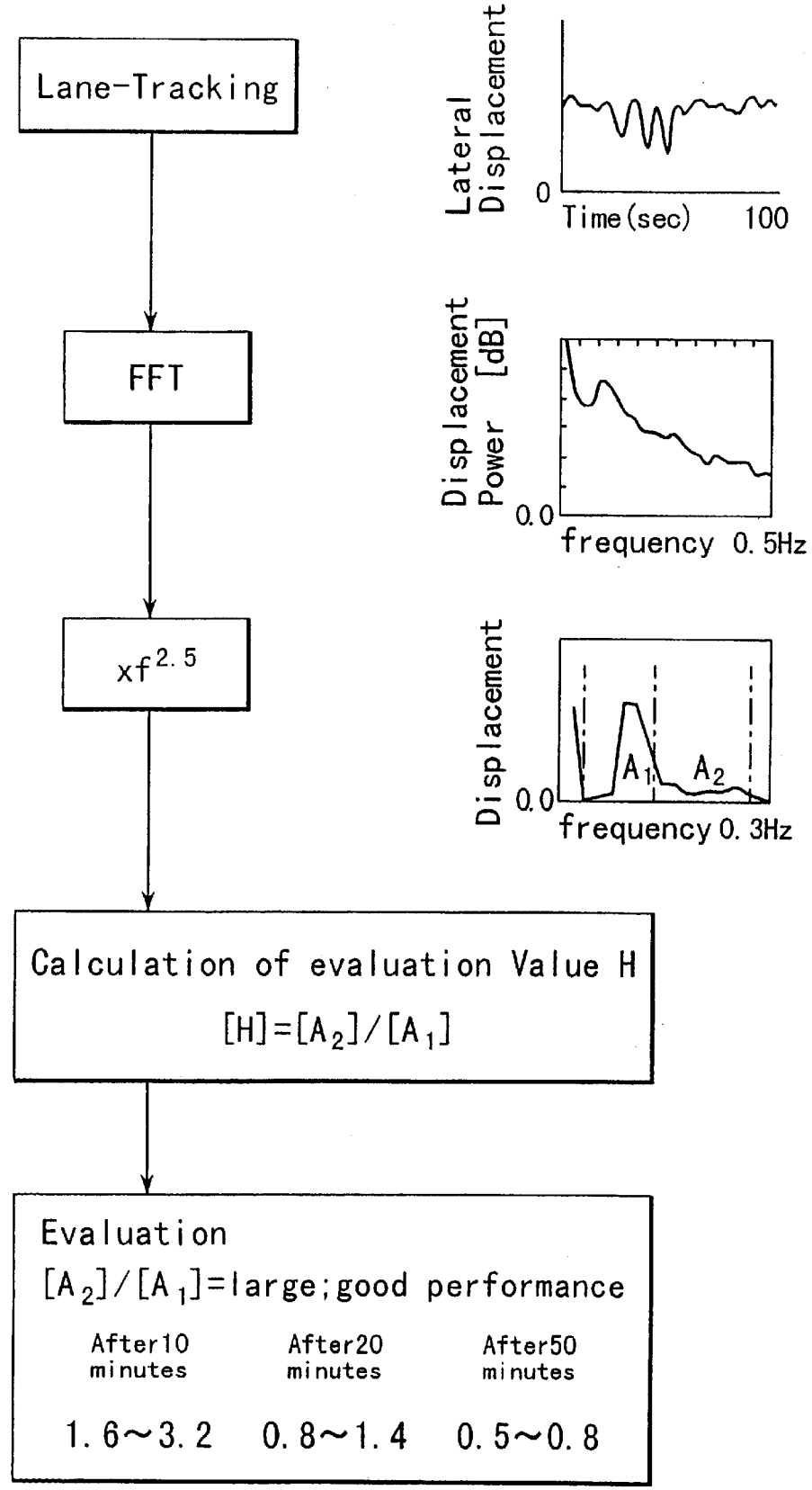
FIG. 3 is an explanatory view showing an algorithm of a first embodiment.

Referring to FIG. 2, first, at a step S101, the displacement quantity data stored in the shift register of the FFT signal processing section 3 for the past X seconds, are read out every Y seconds (for example 90 seconds or below). The sampling time X is established at a relatively long time (for example, 50 to 80 seconds) in order to estimate an arousal level accurately.

Figure 6:
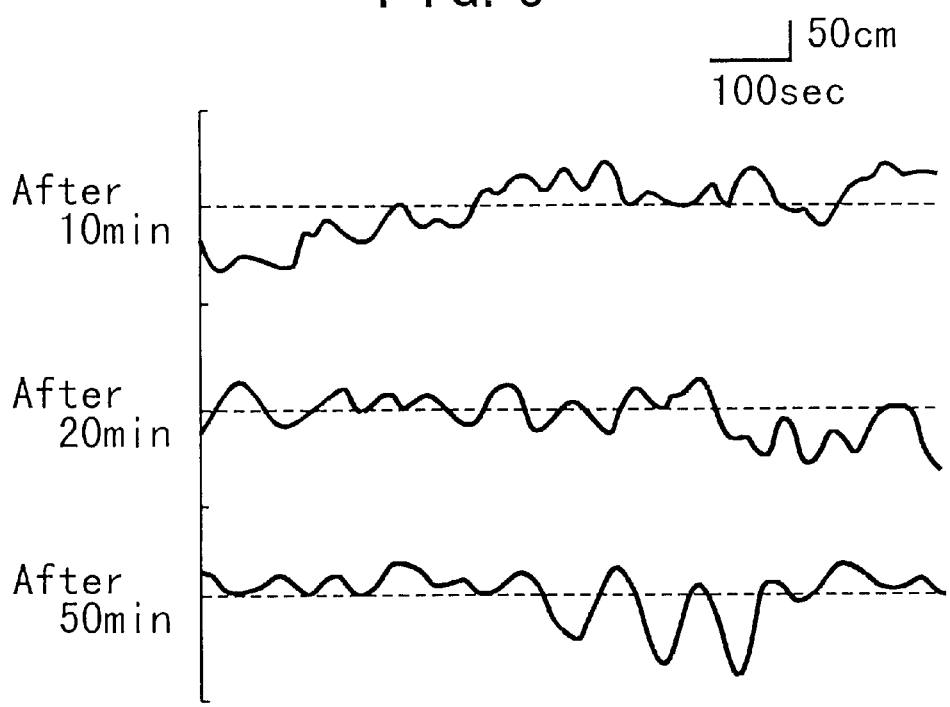
FIG. 6 is a diagram showing a relationship between elapsed time after, the the start of operation and amounts of lateral displacement.
Figure 7:
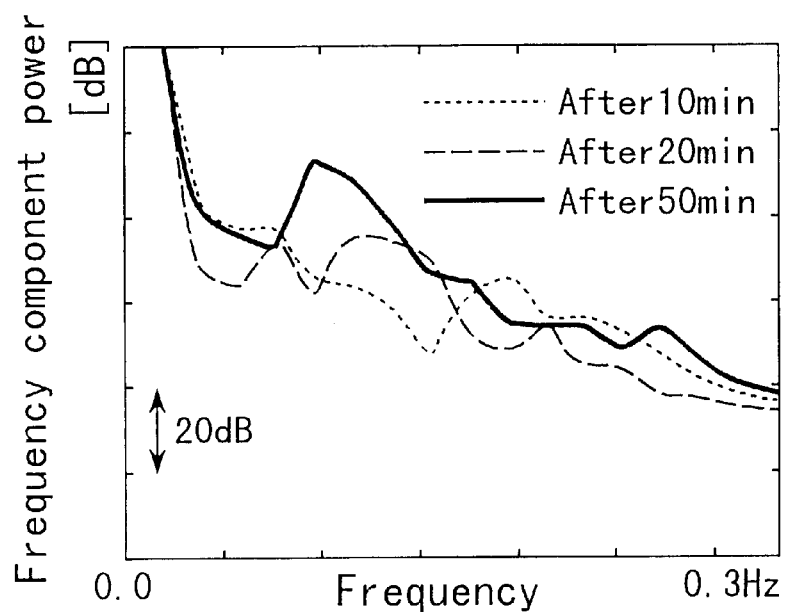
FIG. 7 is a graph showing a power of respective frequency components.

At a step S102, in the FFT signal processing section, this displacement quantity is subjected to a frequency conversion using a high speed Fourier transformation method and each frequency component power (amplitude) p in respective frequency spectrums is calculated. Below, the relationship between displacement quantity and frequency component power will be described. FIG. 6 is a graph showing a relationship between an elapsed time from the start of the vehicle and a change of lateral displacement quantity. These graphs show a result of measurement when a vehicle travels on a relatively uncrowded highway under a relatively monotonous running condition. The graph "After 10 min" shows a state immediately after the vehicle enters into the flow of traffic and the displacement quantity is still small. When 20 minutes elapses, a driver grows accustomed to the running condition, becomes relaxed and as a result, the amplitude of low frequency components increases and on the other hand the one of high frequency components decreases. Further, when 50 minutes elapses, the driver is bored, slightly dozy and sometimes the displacement quantity changes largely. In this case, the amplitude of low frequency components tend to further increase, compared with the graph "After 20 min". FIG. 7 is a graph showing a relationship between frequency components and lateral displacement power, when the displacement quantity for each elapsed time in FIG. 6 is subjected to frequency conversion. In this graph, the dotted line shows a frequency component power p after 10 minutes from the start of the vehicle, the broken line shows a frequency component power p after 20 minutes, and the solid line shows a frequency component power p after 50 minutes, respectively. The graph indicates that the frequency component power p of low frequency domain tends to increase as the running time becomes longer.

At a step S103, the frequency component power p is subjected to a leveling process according to the following formula to obtain a corrected frequency component power p'.

$$p' = P * f^n \quad (1)$$

where exponent n: $2.0 \leq n \leq 3.0$; f=frequency

Figure 8:
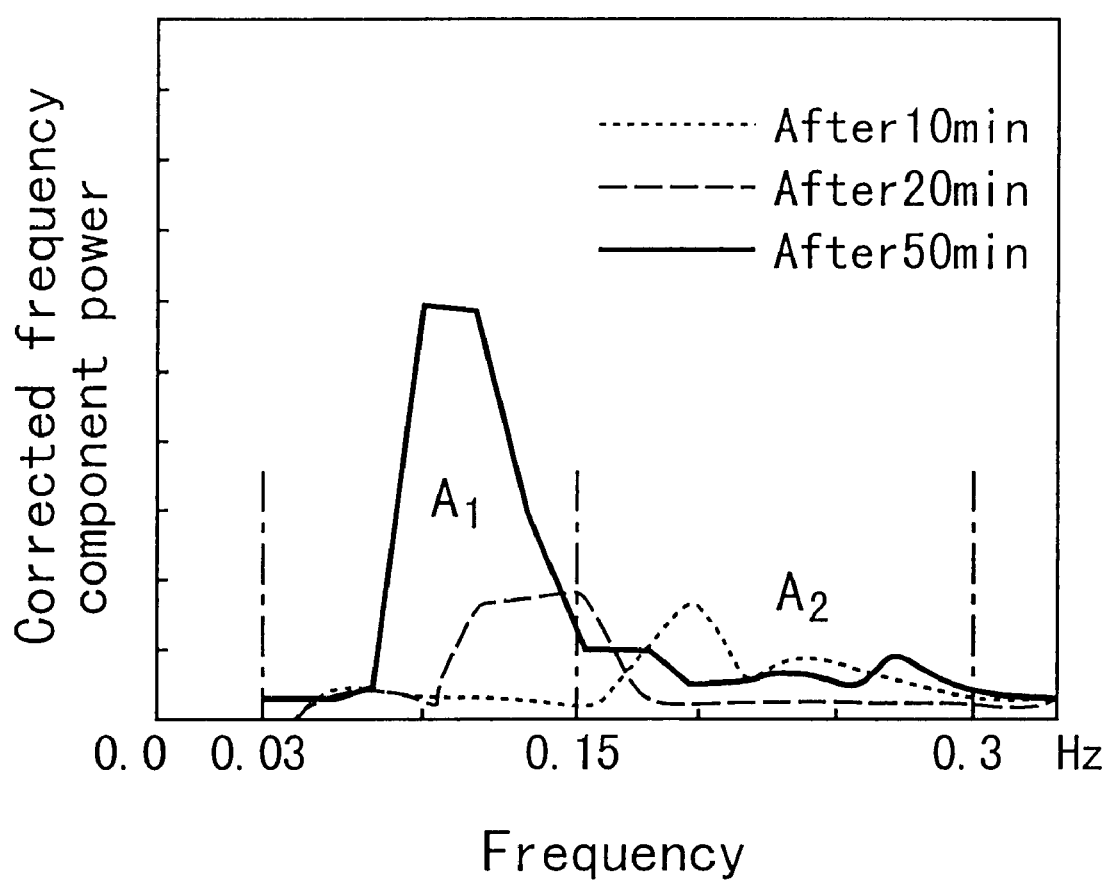
FIG. 8 is an explanatory view of calculation of an evaluation value according to a first embodiment.

Assuming that the fluctuation of the vehicle within a lane is one of various fluctuations existing in the natural world, its amplitude is 1/f and its power is $1/f^2$. Accordingly, the exponent n of the formula 1 is theoretically equal to 2. However, according to experiments, it has been found that n=2.5 is most preferable. The reason why n=2.5 is considered to be ascribed to vehicle and human factors, the effect of roads or the like. Nevertheless, it is possible to judge an arousal level using an exponent ranging from 2.0 to 3.0. FIG. 8 is a graph showing a relationship between frequency component and corrected frequency component power p'. The graph indicates that the frequency component power p' in a low frequency domain after 50 minutes largely increases.

In the calculating section 4, at a step S104, the frequency component power p' is integrated with respect to frequency of a frequency domain above a first frequency $f_1$ and below a reference frequency $f_{th}$ (hereinafter referred to as a low frequency domain) to obtain an area $A_1$ as shown in FIG. 8. Further, at a step S105, the frequency component power p' is integrated with respect to frequency of a frequency domain above the reference frequency $f_{th}$ and below a second frequency $f_2$ (hereinafter, referred to as a high frequency domain) to obtain an area $A_2$. Since the reference frequency $f_{th}$ is a base frequency on which an evaluation value for estimating an arousal level is calculated, it is important to establish it at a proper value. According to experiments by the inventor of the present invention, it is known that a most preferable result can be obtained when 0.15 Hz, a mean value of experiments, is introduced as a reference frequency $f_{th}$.

In calculating the area $A_1$ in the low frequency domain, the reason why a frequency domain below the first frequency $f_1$ (for example, 0.03 Hz) is not taken into consideration, is that the power of that domain has no direct relation with an arousal level of the driver. Generally, when the vehicle travels on a curved road, the power of a very low frequency domain below 0.03 Hz increases. Accordingly, an effect of curve can be eliminated by neglecting the increased power, whereby a proper judgment of the arousal level is available. Further, in calculating the area $A_2$ in the high frequency domain, the reason why a frequency domain above the second frequency $f_1$ (for example, 0.3 Hz) is not taken into consideration, is that the amount of calculation is saved by removing a power of the domain having a small effect on the area $A_2$. The power of the frequency domain above 0.3 Hz is so small that the area $A_2$ does not substantially change even if it is neglected. Specifically, the second frequency $f_2$ may be obtained from the formula, $f_2 = f_{th} + (f_{th} - f_1)$. Thus, it is possible to establish a frequency domain which is an object of calculation at a proper value and to enhance an accuracy of judgment. At a step S106, an evaluation value H is obtained from thus obtained areas $A_1$, $A_2$ according to the following formula:

$$H = A_2/A_1 \quad (2)$$

In the judgment section 5, at a step S107 the evaluation value H is compared with an evaluation threshold value $H_{th}$. If the evaluation value H is lower than the evaluation threshold value $H_{th}$, it is judged at a step S108 that the arousal level of the driver is declined. On the other hand, if the evaluation value H is larger than the threshold value $H_{th}$, it is judged at a step S109 that the arousal level is normal. When the driver is in a normal arousal state, the evaluation value H, a ratio of the area $A_2$ to the area $A_1$, presents a large value because the area $A_2$ in the high frequency domain is large, however it becomes small as the power p' in the low frequency domain increases. That is, the evaluation value H has a large correlation with the arousal level of the driver. Hence, a proper threshold value enables a detection of the decline of a driver's arousal level. According to experiments by the inventor of the present invention, it is known that the evaluation value is 1.6 to 3.2 after 10 minutes elapse from the start of the running, 0.8 to 1.4 after 20 minutes elapse, and 0.5 to 0.8 after 50 minutes elapse. From the results of the experiments, when the threshold value is established to be 1.0 for example, a decline of arousal level after 50 minutes can be detected properly.

When it is judged that the arousal level is declined, a warning section 6 executes a warning process to urge the driver to wake up. One example of the warning process is to sound an alarm of a rear-end collision prevention system. In this case, the inter-vehicle distance at which an alarm is raised is established to be longer than a normal distance. Further, the warning section 6 may sound an alarm of an over-lane preventing system. For example, a timing for raising an alarm immediately when vehicle wheels tread on a lane marker may be established to be slightly earlier. Further, the warning section 6 may be used exclusively for a drowsiness alarm. For example, when the arousal level goes down, a display type alarm on which such a warning as "Beware of sway drive" is displayed may be used in addition to a sound alarm.

According to this embodiment, the driver's arousal level is judged based on the data concurrent with judgment without any prior preparation of reference data. Therefore, it is possible to judge the arousal level properly without being affected by changes of running circumstances. Further, there is no such problem of erroneous judgments caused by changes of driving conditions as in the prior art. Further, this embodiment is not affected largely by vehicle speeds.

In the above embodiment, a ratio of area $A_2$ to $A_1$ is used for the evaluation value H of the arousal level, however a difference between these may be used for judgment. Further, it is possible to judge based on a judgment map on which the areas $A_1$, $A_2$ are arranged in a matrix. The arousal level is described on intersections of the matrix and the result of judgment is read from the description of the arousal level at an intersection corresponding to calculated areas $A_1$, $A_2$. Further, in case of using the evaluation threshold value $H_{th}$, the threshold value $H_{th}$ may be varied according to vehicle speeds.

Further, in this embodiment, the reference frequency $f_{th}$ is a fixed value (for example, 0.15 Hz) which is irrespective of vehicle speeds. Instead of this, the reference frequency $f_{th}$ may be established to be a larger value, as the vehicle speeds increase. Generally, since the lateral displacement per unit time becomes large with an increase of vehicle speeds, the overall graph of the frequency component power shown in FIG. 8 tends to shift on the high frequency side. Therefore, in consideration of this shift characteristic, shifting the reference frequency $f_{th}$ according to vehicle speeds provides more accurate judgment of the driver's arousal level under the high speed condition.

Similarly, it is preferable to establish the first and second frequencies $f_1$, $f_2$ at larger values as the vehicle speeds increase.

By way of an example, respective frequencies $f_1$, $f_{th}$ and $f_2$ are established, and increase nonlinearly according to the vehicle speed, as shown in the following table:

TABLE 1

Frequencies according to vehicle speeds

| | $f_1$ | $f_{th}$ | $f_2$ |
|---|---|---|---|
| 80 km/h | 0.0300 Hz | 0.1500 Hz | 0.3000 Hz |
| 100 km/h | 0.0359 Hz | 0.1793 Hz | 0.3586 Hz |
| 120 km/h | 0.0400 Hz | 0.2000 Hz | 0.4000 Hz |

Further, in the embodiment described before, the driver's arousal level is judged by direct use of the frequency component power p, however, alternatively, it may be judged from a corrected frequency power "P" obtained by multiplying a correction coefficient "a" as shown in the following formula:

$$P = p \times a \quad (3)$$

The correction coefficient "a" is established so as to increase nonlinearly with an increase of vehicle speeds. As an example, "a" is established to be $80^{0.8}$ at 80 km/h, $100^{0.8}$ at 100 km/h, and $100^{0.8} + 20^{0.6}$ at 120 km/h. Letting initial values of the first frequency $f_1$, the reference frequency $f_{th}$ and the second frequency $f_2$, be 0.03, 0.15 and 0.30, respectively, corrected frequencies at respective vehicle speeds, $f_1'$, $f_{th}'$ and $f_2'$ are calculated according to the formula (3) as shown in the following table:

TABLE 2

Corrected frequencies according to vehicle speeds

| | $f_1$ | $f_{th}$ | $f_2$ |
|---|---|---|---|
| 80 km/h | 1.00 Hz | 5.00 Hz | 9.99 Hz |
| 100 km/h | 1.19 Hz | 5.97 Hz | 11.94 Hz |
| 120 km/h | 1.38 Hz | 6.68 Hz | 13.75 Hz |

The frequency component power and the frequencies $f_1$, $f_{th}$ and $f_2$ are normalized using the correction coefficient "a" established at every vehicle speed. Then, based on the normalized frequency component power, the evaluation value H is calculated. Thus, the evaluation domain (frequency domain) can be dealt with in a uniform manner.

(Second Embodiment)

Figure 4:
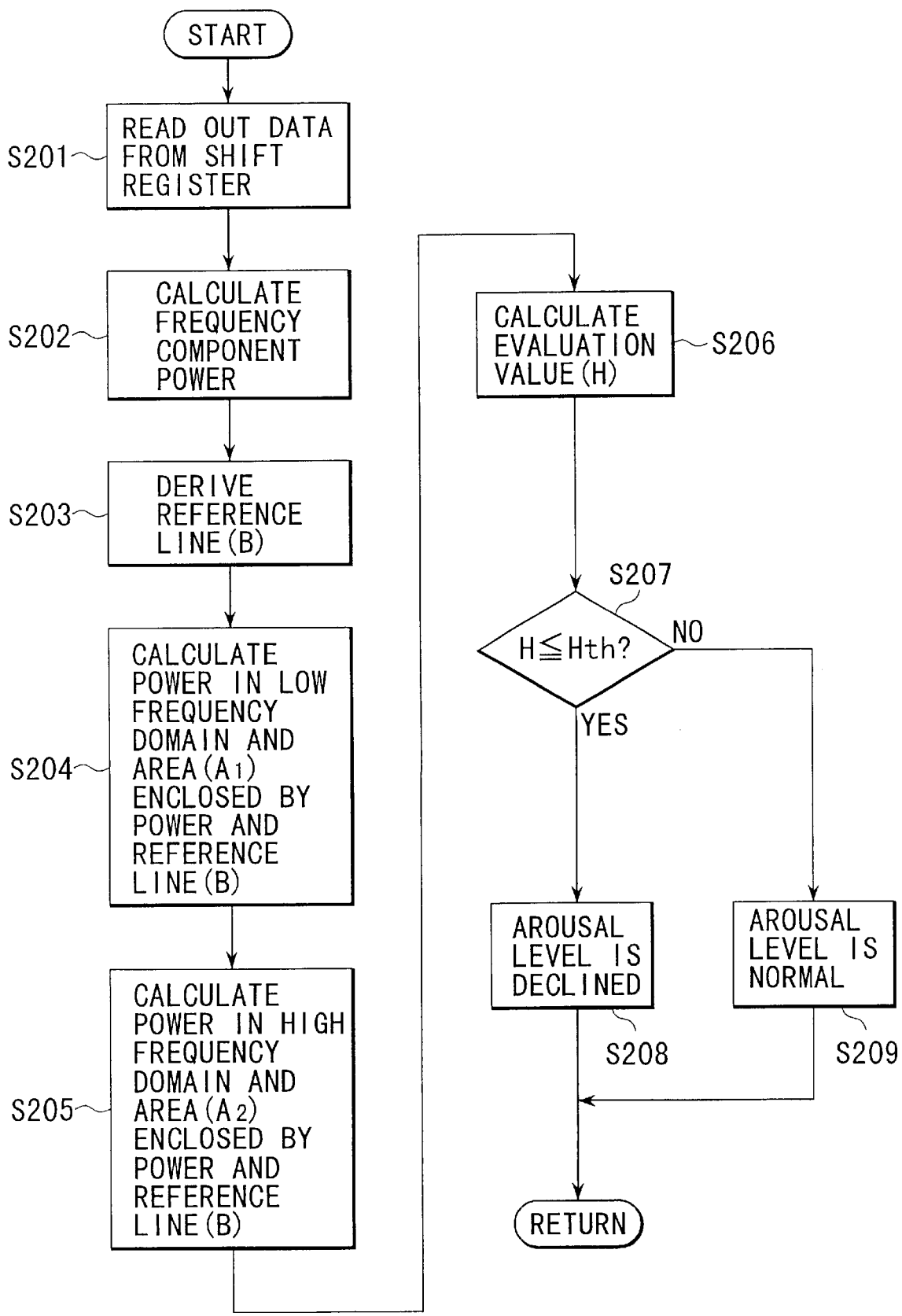
FIG. 4 is a flowchart showing steps for estimating an arousal level according to a second embodiment of the present invention.
Figure 9:
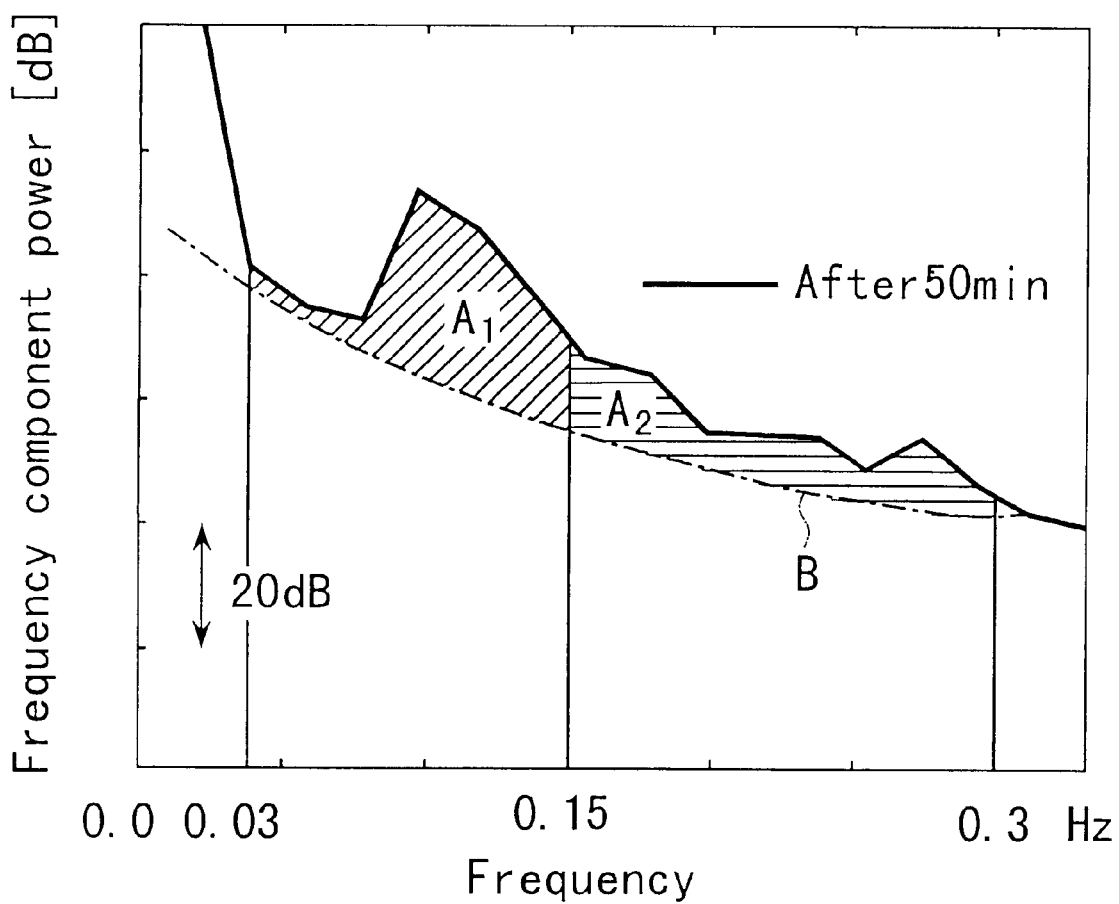
FIG. 9 is an explanatory view of calculation of an evaluation value according to a second embodiment.

FIG. 4 is a flowchart: showing steps for estimating an arousal level according to a second embodiment. In the second embodiment, the evaluation value is directly calculated from an area enclosed by a frequency component power and a reference line and therefore a leveling process of the frequency component power which has been described in the first embodiment is not performed in this embodiment. First, at steps S201 and S202, the frequency component power p is calculated and at a step S203, a predetermined reference line B is derived. The reference line B is shown in a one-dot broken line of FIG. 9 and expressed by the following formula.

$$p = K * f^{-n} + C \quad (4)$$

where p is a frequency component power of the reference line B; exponent n: $2.0 \leq n \leq 3.0$ (in this embodiment n=2.5); K and C are constants.

At a step S204, an area $A_1$ (shown by slanting lines of FIG. 9) is obtained by subtracting an integral of the reference line B with respect to frequency of a low frequency domain from an integral of the frequency component power p with respect to frequency of a low frequency domain. Further, at a step S205, an area $A_2$ (shown by horizontal lines of FIG. 9) is obtained by subtracting an integral of the reference line B with respect to frequency of a high frequency domain from an integral of the frequency component power p with respect to frequency of a high frequency domain. Then at a step S206, an evaluation value H is obtained from the formula (2). Below, at steps S207 through S209, a decline of the driver's arousal level is detected in accordance with the same steps as those described at steps S107 and after in the first embodiment.

In this embodiment, the areas $A_1$, $A_2$ are dependant only on frequency component power of displacement quantity and are not dependant on the reference line B. Accordingly, the evaluation value H making a ratio of areas $A_1$ and $A_2$ increases as the power of the high frequency domain becomes large and decreases as the power of the low frequency domain becomes large. Thus, the decline of a driver's arousal level can be detected from the evaluation value H having correlation with the frequency component power.

Further, in this embodiment, since the driver's decline of arousal level is judged based on the data when judgment is required without any prior preparation of the sample data on a normal operation, it is possible to judge the arousal level properly without being affected by changes of running circumstances.

The calculation method of areas according to this embodiment is substantially the same as the calculation method according to the first embodiment, in which areas are calculated after the frequency component power p is subjected to the leveling process. That is, when both sides of the formula (4) are multiplied by $f^{2.5}$, the frequency component power p agrees with the corrected frequency component power p' and as a result $f^{-n}$ is canceled from the reference line B, the reference line becoming a lateral line, which corresponding to an axis of abscissa of FIG. 8 according to the first embodiment. Hence, it is understood that the leveling process in the first embodiment is a process for making peaks of the frequency component power conspicuous by canceling inherent changes of the frequency component power.

Alternatively, an integral (area) of the frequency component power p in low and high frequency domains may be simply obtained to produce a ratio of these two areas for establishing an evaluation value H. In this case, the area of low frequency domain is inevitably larger than that of high frequency domain regardless of lateral displacements of the vehicle, due to the power characteristic that the power becomes small as frequency becomes higher. Therefore, if the evaluation threshold value $H_{th}$ is established to be rather high, taking this characteristic into consideration, it will be possible to judge a driver's arousal level properly. What is important is to calculate a proper evaluation value for judging the arousal level based on an integration of the frequency component power in low and high frequency domains, but not to execute a leveling process as in the first embodiment, nor to use a reference line B as in the second embodiment. It should be noted that the reason why the leveling process or the reference line is employed lies in that the evaluation value H not affected by the power characteristic is calculated. In view of the essence of the present invention, there is no substantial difference between taking the power characteristic into consideration in calculating the evaluation value H and taking the power characteristic into consideration in establishing the evaluation threshold value $H_{th}$.

(Third Embodiment)

Figure 5:
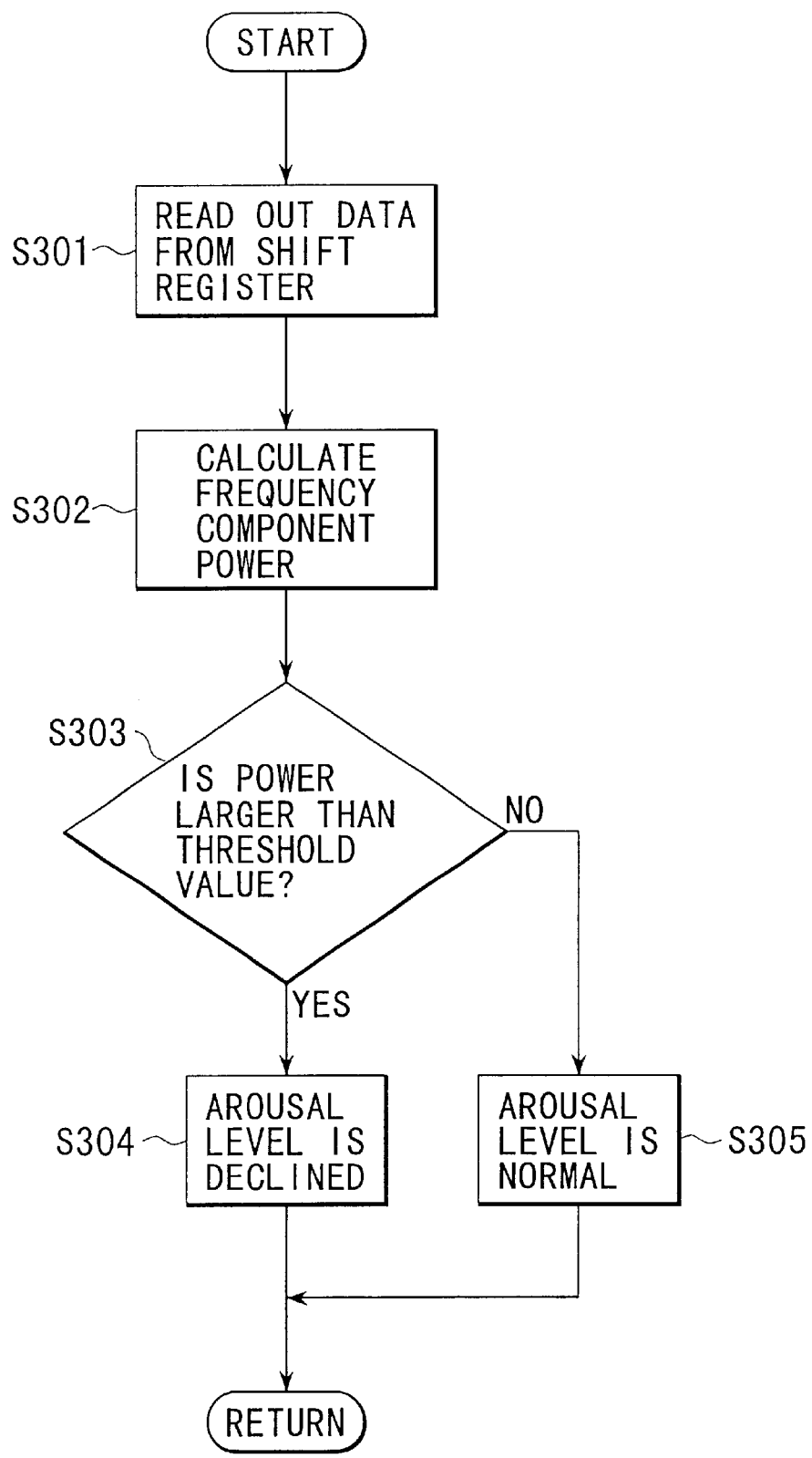
FIG. 5 is a flowchart showing steps for estimating an arousal level according to a third embodiment of the present invention.

FIG. 5 is a flowchart showing steps of estimating the arousal level according to a third embodiment. In the first and second embodiments, the arousal level is judged based on the integral of the frequency component power p. On the other hand, in the third embodiment, the arousal level is judged based on a peak value of the frequency component power p. First, at steps S301 and S302, the frequency component power p is calculated then, at a step S303, it is judged whether or not there is a frequency component power p larger than a threshold value $P_{th}$ in the low frequency domain.

Figure 10:
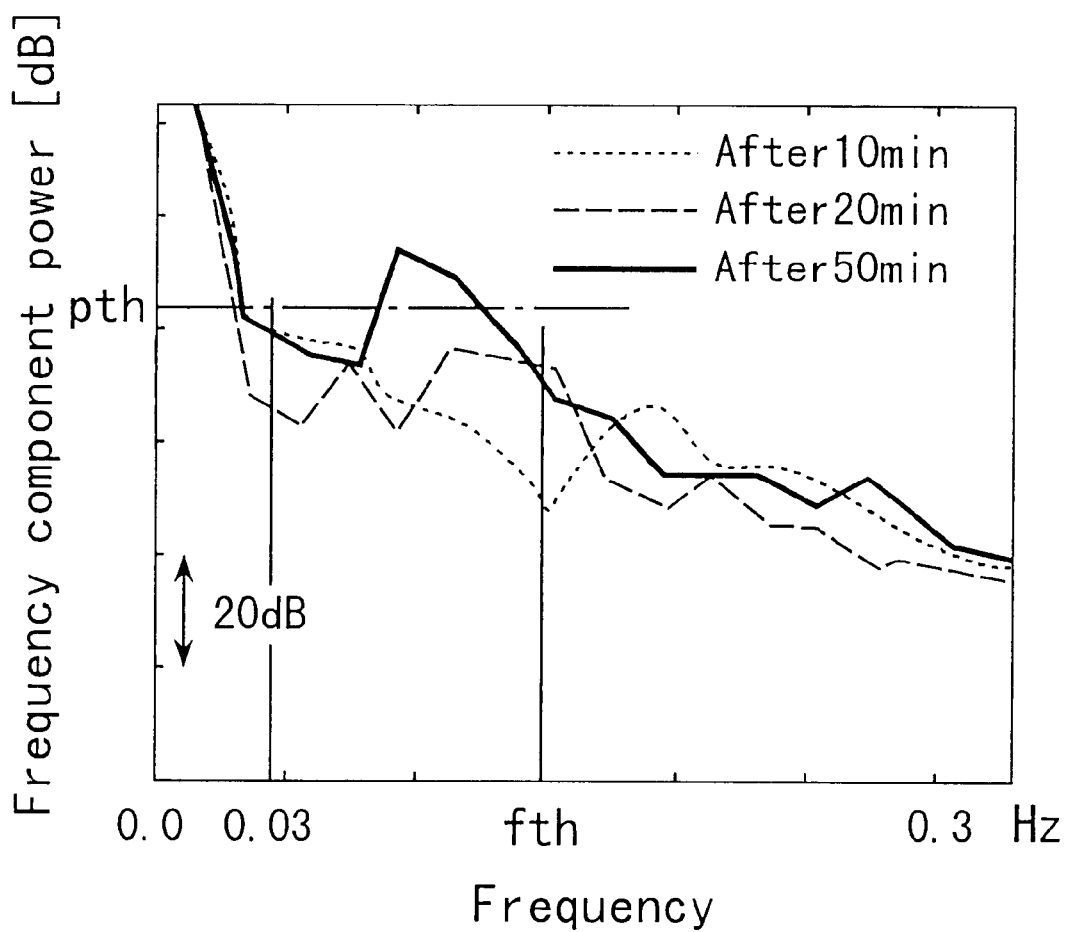
FIG. 10 is an explanatory view of calculation of an evaluation value according to a third embodiment.

As described before, as the driver's arousal level becomes lower, the frequency component power in the low frequency domain increases. Referring to FIG. 10, when a peak value of the power p in the low frequency domain exceeds the threshold value $p_{th}$, it is judged at a step S304 that the arousal level is declined and a required warning process is executed. On the other hand, if the peak value of the power p is lower than the threshold value $p_{th}$, it is judged at a step S305 that the arousal level is normal.

According to this embodiment, since the driver's arousal level can be judged only based on the data concurrent with judgement, it is possible to make a judgement with relatively small amount of calculation.

As described before, the frequency component power p has such a characteristic as going down with an increase of frequency. Due to this characteristic, there is a defect that the frequency component power p of the low frequency domain exceeds the threshold value $p_{th}$ with its relatively low peak value and the power p of the high frequency domain does not exceed the threshold value $p_{th}$ even with its relatively large peak value. To overcome this defect, this embodiment can be modified as follows.

First, a corrected frequency component power p' is calculated according to the same steps as shown in the first embodiment. Since the power characteristic is deleted from the power p' (refer to FIG. 8), the arousal level can be judged more accurately by comparing the peak value of the power p' with a threshold value $p'_{th}$.

Secondly, the low frequency domain is further divided into a plurality of domains and a threshold value $p_{th}$ is established for each of the divided domains. The threshold value $p_{th1}$ of the domain having a low frequency is established to be larger than the threshold value $p_{th2}$ of the domain having a high frequency. Thus, the arousal level can be judged more accurately than the case where the same threshold value is used over the entire low frequency domain.

(Fourth Embodiment)

Further, in the aforementioned first, second and third embodiments, the judgment of the driver's arousal level may be carried out when at least one of the following running conditions is satisfied.

Condition 1: when a vehicle speed exceeds a predetermined value (for example, 80 km/h);

Condition 2: when a cruise control is set; in this case, the driver's arousal level tends to decline.

Condition 3: when engine speed is lower than 1,000 r.p.m and when that state does not last more than 5 seconds;

Condition 4: when the length of the road is more than a specified value (for example 1 km) and the width of the road is substantially constant;

Condition 5: when the vehicle speed is more than a specified value and that speed is maintained for more than specified time; and Condition 6: when a specified condition is satisfied based on information from a navigation system.

In the light of the individual variations in the evaluation value H when a driver arouses or the change thereof, it is more preferable to establish the evaluation threshold value $H_{th}$ individually. The evaluation threshold value $H_{th}$ is established based on the operation quantity of the vehicle within a "sampling period" wherein the driver is assumed to arouse. The "sampling period" should be a period from 5 minutes to 10 minutes starting from the time when the vehicle comes into the running conditions under which the driver's arousal level is to be judged. The reason why the sampling starting time is 5 minutes is that, since the driver is apt less to adjust himself to the running circumstances in an early period of driving, a certain period is necessary for adjustment. Further, the reason why the sampling finishing time is 10 minutes is that 10 minutes or thereabout is long enough to secure a required number of samples and also is adequate to detect the driver's arousal level. In this sampling period, the evaluation value H is calculated for every displacement data acquired during the past X seconds (for example, 50 to 80 seconds or thereabout). Then, a plurality of evaluation values H are averaged to produce "initial evaluation value $H_{ini}$" as a mean value of the evaluation value H. The evaluation threshold value $H_{th}$ is established at 60 percent of the initial evaluation value $H_{ini}$, for example. That is, in case where the vehicle runs rather in a swaying manner from the early stage of the sampling period, the initial evaluation value $H_{ini}$ becomes small. Accordingly, since the evaluation threshold value $H_{th}$ for evaluating this driver is established to be small, the judgment reference for judging the arousal level is alleviated, compared to that of average drivers.

On the other hand, in case where the degree of swaying is smaller than that of average drivers, the threshold value $H_{th}$ is established at a larger value.

Thus establishing the threshold value $H_{th}$ in consideration of individual differences in the driving characteristic enables one to estimate the driver's arousal level more accurately. Further, it is preferable to calculate the threshold value only when the vehicle speed in the sampling period is continuously more than a predetermined value (for example 80 km/h). In case where the vehicle catches up with a preceding vehicle, or in other cases, the vehicle speed goes down below the predetermined value. In such running conditions, considering that the fluctuating characteristic of the dozing state is less likely to occur, the calculated samples are preferably canceled. Further, in this case, the calculation of the samples is performed over again from the beginning or predetermined threshold value is employed.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An arousal level estimating apparatus of a vehicle for estimating an arousal level of a driver, comprising:
    vehicular behavior detecting means for continuously detecting behavior of said vehicle;
    a power calculating means for calculating a frequency component power by applying a frequency conversion to said vehicular behavior;
    a low frequency domain establishing means for establishing a low frequency domain lower than a reference frequency;
    a high frequency domain establishing means for establishing a high frequency domain higher than said reference frequency;
    an evaluation value calculating means for obtaining a first integral of said frequency component power in said low frequency domain, for obtaining a second integral of said frequency component power in said high frequency domain, and for calculating an evaluation value based on said first integral and said second integral; and
    a judging means for judging an arousal level of said driver based on said evaluation value.

2. The apparatus according to claim 1, wherein said vehicular behavior is a lateral displacement of said vehicle.

3. The apparatus according to claim 1, wherein said frequency component power is a frequency component power subjected to a leveling process.

4. The apparatus according to claim 3, wherein said frequency component power subjected to a leveling process is equal to said frequency component power multiplied by a nth power of a frequency.

5. The apparatus according to claim 4, wherein said exponent n is a value larger than 2.0 and smaller than 3.0.

6. The apparatus according to claim 1, wherein said evaluation value calculating means is a means for obtaining a third integral of a reference line in said low frequency domain, for obtaining a fourth integral of said reference line in said high frequency domain, and for calculating an evaluation value from a difference between said first integral and said third integral and a difference between said second integral and fourth integral and said reference line is established such that said reference line cancels a change based on a characteristic of said frequency component power.

7. The apparatus according to claim 1, wherein said low frequency domain is a domain below said reference frequency and above a first frequency from which a very low frequency produced when said vehicle travels on a curved road is deleted.

8. The apparatus according to claim 1, wherein said high frequency domain is a domain above said reference frequency and below a second frequency which is obtained by adding a difference between said reference frequency and said first frequency to said reference frequency.

9. The apparatus according to claim 1, wherein said evaluation value is a ratio of said second integral to said first integral.

10. The apparatus according to claim 1, wherein said reference frequency is established at a larger value with an increase of a vehicle speed.

11. The apparatus according to claim 1, wherein said judging means is a means for judging said arousal level by comparing said evaluation value with a second threshold value.

12. The apparatus according to claim 11, wherein said second threshold value is variable in accordance with a vehicle speed.

13. The apparatus according to claim 11, wherein said second threshold value is established according to an initial evaluation value and said initial evaluation value is calculated based on said vehicular behavior acquired within a predetermined sampling period.

14. The apparatus according to claim 13, wherein said predetermined sampling period is a period starting when a specified time elapses from a time to start judging a driver's arousal level.

15. An arousal level estimating apparatus of a vehicle for estimating an arousal level of a driver, comprising:
- vehicular behavior detecting means for continuously detecting vehicular behavior of said vehicle;
- a power calculating means for calculating a frequency component power by applying a frequency conversion to said vehicular behavior;
- a low frequency domain establishing means for establishing a low frequency domain lower than a reference frequency; and
- a high frequency domain establishing means for establishing a high frequency domain higher than said reference frequency;
- means for forming a ratio of the integrals of the frequency component power with respect to frequency in the low and the high frequency domains; and
- a judging means for judging that an arousal level of said driver has declined when said frequency component power exceeds a first threshold value in said low frequency domain; and
- wherein said judging means judges the arousal level based on said ratio.

16. The apparatus according to claim 15, wherein said vehicular behavior includes at least a lateral displacement of said vehicle.

17. An arousal level estimating apparatus of a vehicle for estimating an arousal level of a driver, comprising:
- vehicular behavior detecting means for continuously detecting vehicular behavior of said vehicle;
- a power calculating means for calculating a frequency component power by applying a frequency conversion to said vehicular behavior;
- a low frequency domain establishing means for establishing a low frequency domain lower than a reference frequency; and
- a judging means for judging that an arousal level of said driver has declined when said frequency component power exceeds a first threshold value in said low frequency domain; and
- wherein said low frequency domain is a domain below said reference frequency and above a first frequency from which a very low frequency produced when said vehicle travels on a curved road is deleted.

18. An arousal level estimating apparatus of a vehicle for estimating an arousal level of a driver, comprising:
- vehicular behavior detecting means for continuously detecting vehicular behavior of said vehicle;
- a power calculating means for calculating a frequency component power by applying a frequency conversion to said vehicular behavior;
- a low frequency domain establishing means for establishing a low frequency domain lower than a reference frequency; and
- a judging means for judging that an arousal level of said driver has declined when said frequency component power exceeds a first threshold value in said low frequency domain; and
- wherein said reference frequency is established at a larger value with an increase of a vehicle speed.

19. An arousal level estimating method of a vehicle for estimating an arousal level of a driver, comprising the steps of:
- continuously detecting behavior of said vehicle;
- calculating a frequency component power by applying a frequency conversion to said vehicular behavior;
- establishing a low frequency domain lower than a reference frequency;
- establishing a high frequency domain higher than said reference frequency;
- obtaining a first integral of said frequency component power in said low frequency domain, obtaining a second integral of said frequency component power in said high frequency domain, and calculating an evaluation value based on said first integral and said second integral; and
- judging an arousal level of said driver based on said evaluation value.

* * * * *